US012683836B2

(12) United States Patent
Wu

(10) Patent No.: US 12,683,836 B2
(45) Date of Patent: Jul. 14, 2026

(54) SEQUENCE DETECTION DEVICE USING MAXIMUM LIKELIHOOD SEQUENCE DETECTION WITH PROGRAMMABLE BRANCH METRIC COMPUTATION REDUCTION AND ASSOCIATED SEQUENCE DETECTION METHOD

(71) Applicant: Airoha Technology Corp., Hsinchu City (TW)

(72) Inventor: Min-Hua Wu, Hsinchu County (TW)

(73) Assignee: Airoha Technology Corp., Hsinchu City (TW)

( * ) Notice: Subject to any disclaimer, the term of this patent is extended or adjusted under 35 U.S.C. 154(b) by 0 days.

(21) Appl. No.: 18/939,444

(22) Filed: Nov. 6, 2024

(65) Prior Publication Data

US 2026/0128930 A1 May 7, 2026

(51) Int. Cl.
| | |
|---|---|
| *H03D 1/00* | (2006.01) |
| *H04L 25/03* | (2006.01) |
| *H04L 25/06* | (2006.01) |
| *H04L 27/06* | (2006.01) |

(52) U.S. Cl.
CPC .. *H04L 25/03267* (2013.01); *H04L 25/03203* (2013.01); *H04L 25/061* (2013.01)

(58) Field of Classification Search
CPC ............. H04L 25/03267; H04L 25/061; H04L 25/03203; H04L 1/0066; H04L 1/20; H04L 25/066; H04L 25/03292; H04L 27/02; H04L 25/03286; H04L 25/03171; H04L 25/03057; H03M 13/4146

USPC ........ 375/341, 264, 265, 262, 233, 232, 234
See application file for complete search history.

(56) References Cited

U.S. PATENT DOCUMENTS

| | | | | |
|---|---|---|---|---|
| 6,356,586 | B1* | 3/2002 | Krishnamoorthy | .......................... H04L 25/03286 375/233 |
| 6,775,334 | B1* | 8/2004 | Liu | .......................... H04L 27/02 375/341 |
| 7,266,146 | B2* | 9/2007 | Pare, Jr. | ............. H04L 25/03292 375/232 |
| 2007/0140329 | A1* | 6/2007 | Zhang | ................ H04L 25/03057 375/233 |
| 2010/0266071 | A1* | 10/2010 | Chen | .................. H03M 13/4146 375/341 |
| 2019/0372607 | A1* | 12/2019 | Riani | ................. H04L 25/03171 |

(Continued)

*Primary Examiner* — Phuong Phu
(74) *Attorney, Agent, or Firm* — Winston Hsu

(57) ABSTRACT

A sequence detection device includes a feed-forward filter, a feedback filter, a combining circuit, a decision circuit, and a sequence detection circuit. The feed-forward filter processes a received signal to generate a first equalized signal. The feedback filter processes a symbol decision signal to generate a second equalized signal. The combining circuit combines the first and second equalized signals to generate a sample signal. The decision circuit performs hard decision upon the sample signal to generate the symbol decision signal. The sequence detection circuit performs sequence detection upon the first equalized signal, and includes a region estimation circuit and a trellis selection circuit. The region estimation circuit is independent of the decision circuit, and categorizes each sample of the sample signal into one region. The trellis selection circuit selects one trellis scheme for branch metric calculation according to region estimation results output from the region estimation circuit.

20 Claims, 17 Drawing Sheets

(56) References Cited

U.S. PATENT DOCUMENTS

| | | | | |
|---|---|---|---|---|
| 2020/0366536 A1* | 11/2020 | Kang | ......................... | H04L 1/20 |
| 2023/0118769 A1 | 4/2023 | Liu | | |
| 2023/0143854 A1 | 5/2023 | Venezia | | |
| 2023/0291544 A1 | 9/2023 | Turner | | |
| 2023/0308322 A1* | 9/2023 | Weng | .................... | H04L 25/066 |
| 2025/0343561 A1* | 11/2025 | Xia | ....................... | H04L 1/0066 |

* cited by examiner

X=3 (fixed)

X=5 (fixed)

FIG. 10

SEQUENCE DETECTION DEVICE USING MAXIMUM LIKELIHOOD SEQUENCE DETECTION WITH PROGRAMMABLE BRANCH METRIC COMPUTATION REDUCTION AND ASSOCIATED SEQUENCE DETECTION METHOD

BACKGROUND OF THE INVENTION

1. Field of the Invention

The present invention relates to data communications, and more particularly, to a sequence detection device using maximum likelihood sequence detection with programmable branch metric computation reduction and an associated sequence detection method.

2. Description of the Prior Art

In high-speed data communication systems, existing filtering and equalization schemes may not be enough to support challenging channels. For example, due to the high demand of data communication speed, data bandwidth grows significantly. As a result, inter-symbol interference (ISI) of a data channel and crosstalk interference from adjacent data channels becomes more severe, and the data modulation scheme is more complex. A typical feed-forward equalizer (FFE) can remove the pre-cursor ISI and the post-cursor ISI by using information from adjacent symbols. However, since the typical FFE does not use any noise-free estimated symbol (e.g., noise-free sliced symbols), the noise apart from ISI may be enhanced by the typical FFE. A typical decision-feedback equalizer (DFE) can remove the post-cursor ISI by using one or more noise-free estimated previous symbols (e.g., one or more noise-free sliced previous symbols). However, error propagation may be induced by the typical DFE due to the reliance on previous decision(s). In other words, traditional linear equalization method (e.g., feed-forward equalization) and non-linear equalization method (e.g., decision-feedback equalization) are unable to provide sufficient performance for some circumstances. Maximum likelihood sequence detection (MLSD) utilizes and further removes the ISI to deal with noise, and becomes a popular technique to enhance performance and overcome non-linear error in the high-speed data communication system. However, MLSD needs to implement a Viterbi algorithm, and has a higher level of implementation complexity and a higher level of computation resource consumption. For example, to practice a Viterbi algorithm in a system that has K data states, the number of branch metric (BM) calculations in one data cycle may be $K^2$, which means lots of computation resources needed to acquire BM information. Thus, there is a need for innovative low-complexity and power-efficient MLSD in a sequence detector used by the high-speed data communication system.

SUMMARY OF THE INVENTION

One of the objectives of the claimed invention is to provide a sequence detection device using maximum likelihood sequence detection with programmable branch metric computation reduction and an associated sequence detection method.

According to a first aspect of the present invention, an exemplary sequence detection device is disclosed. The exemplary sequence detection device includes a feed-forward filter, a feedback filter, a combining circuit, a decision circuit, and a sequence detection circuit. The feed-forward filter is configured to process a received signal to generate a first equalized signal. The feedback filter is configured to process a symbol decision signal to generate a second equalized signal. The combining circuit is configured to combine the first equalized signal and the second equalized signal to generate a sample signal. The decision circuit is configured to perform hard decision upon the sample signal to generate the symbol decision signal. The sequence detection circuit is configured to perform sequence detection upon the first equalized signal to generate and output a symbol sequence. The sequence detection circuit includes a region estimation circuit and a trellis selection circuit. The region estimation circuit is independent of the decision circuit, and configured to categorize each of a plurality of samples included in the sample signal into one of a plurality of regions. The trellis selection circuit is configured to select one of a plurality of trellis schemes for branch metric calculation according to region estimation results of two of the plurality of samples output from the region estimation circuit.

According to a second aspect of the present invention, an exemplary sequence detection method is disclosed. The exemplary sequence detection method includes: performing a feed-forward filtering operation upon a received signal to generate a first equalized signal; performing a feedback filtering operation upon a symbol decision signal to generate a second equalized signal; combining the first equalized signal and the second equalized signal to generate a sample signal; performing a hard decision operation upon the sample signal to generate the symbol decision signal; and performing a sequence detection operation upon the first equalized signal to generate and output a symbol sequence. The sequence detection operation includes: performing a region estimation operation to categorize each of a plurality of samples included in the sample signal into one of a plurality of regions, wherein the region estimation is independent of the hard decision; and performing a trellis selection operation to select one of a plurality of trellis schemes for branch metric calculation according to region estimation results of two of the plurality of samples output from the region estimation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 is a diagram illustrating fixed trellis schemes used by the trellis selection circuit according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
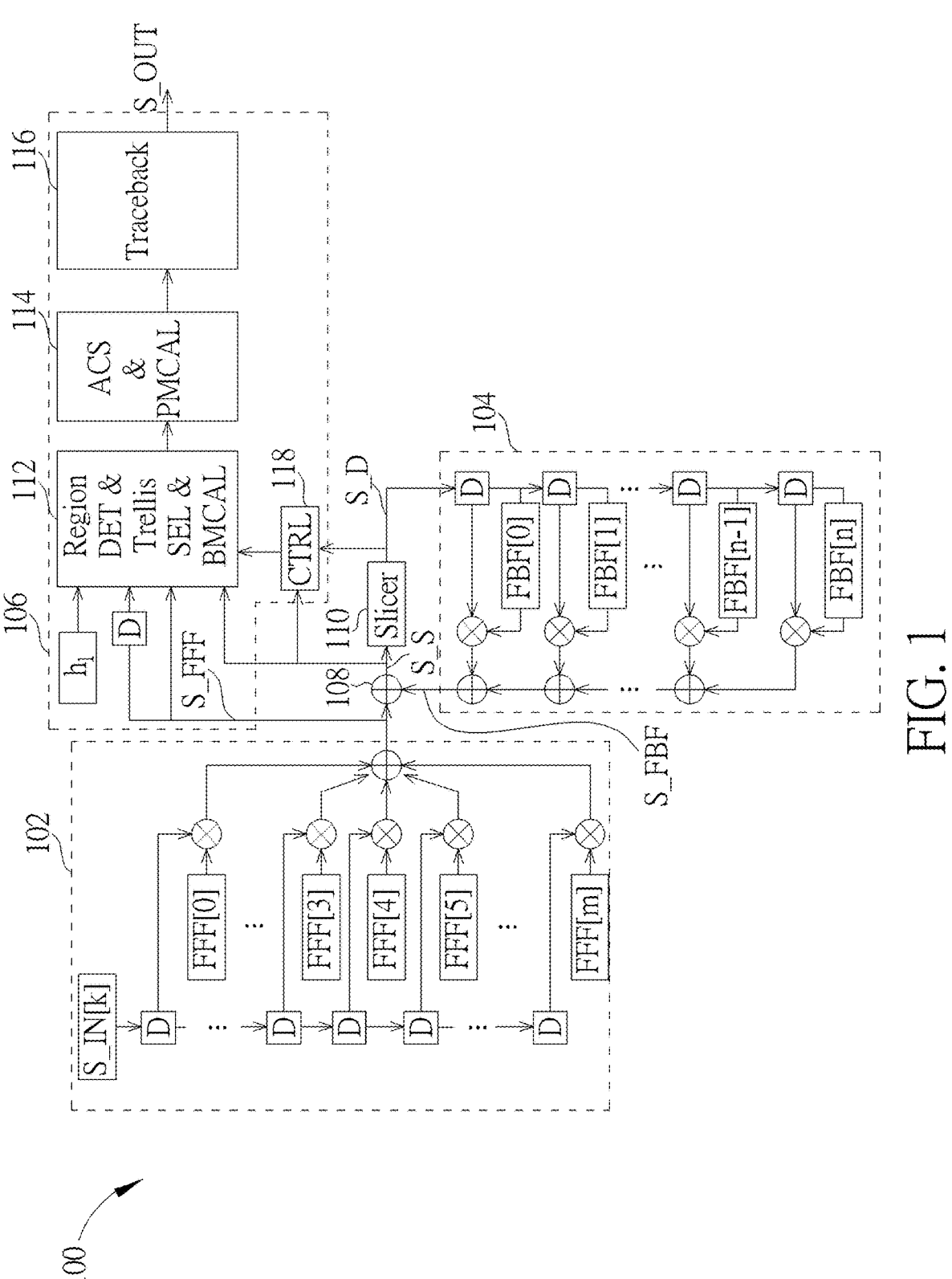
FIG. 1 is a diagram illustrating a sequence detection device using MLSD with programmable BM computation reduction according to an embodiment of the present invention.

FIG. 1 is a diagram illustrating a sequence detection device using maximum likelihood sequence detection (MLSD) with programmable branch metric (BM) computation reduction according to an embodiment of the present invention. The sequence detection device 100 may be a part of a receiver in a data communication system. In this embodiment, the sequence detection device 100 is a digital circuit, and includes a feed-forward filter (FFF) 102, a feedback filter (FBF) 104, a sequence detection circuit 106, a combining circuit 108, and a decision circuit (labeled by "slicer") 110. For example, the FFF 102 may be a feed-forward equalizer (FFE), and the FBF 104 may be a decision-feedback equalizer (DFE). The FFF 102 may be implemented by an (m+1)-tap FFE having (m+1) FFE coefficients FFF[0]-FFF[m] (m≥0). However, this is for illustrative purposes only, and is not meant to be a limitation of the present invention. In practice, any suitable FFE structure may be employed by the FFF 102. That is, the present invention has no limitations on the FFF design.

The FFF 102 is configured to process a received signal S_IN[k] to generate an equalized signal S_FFF as a data signal to be processed by sequence detection (e.g., MLSD), where the received signal S_IN[k] is a digital signal generated from an analog-to-digital converter (ADC) of the receiver. For example, a pulse-amplitude modulation (PAM) signal is generated and transmitted from a transmitter of the data communication system to the receiver of the data communication system via a channel, and the received signal S_IN[k] is a digital signal derived from the PAM signal. Taking 4-level PAM (PAM4) signaling for example, there are four symbols {−3, −1, +1, +3}, and each symbol corresponds to a pair of two bits. For example, four bit choices 00, 01, 10, and 11 may be associated with amplitudes of −3, −1, +1, and +3, respectively. For another example, a quadrature amplitude modulation (QAM) signal is generated and transmitted from a transmitter of the data communication system to the receiver of the data communication system via a channel, and the received signal S_IN[k] is a digital signal derived from the QAM signal. Taking 16-QAM signaling for example, there are sixteen symbols, and each symbol corresponds to a sequence of four bits. For example, four bit choices "00", "01", "10", and "11" may be associated with different amplitudes of −3, −1, +1, and +3 in the in-phase (I) axis/quadrature (Q) axis, respectively.

The FBF 104 is configured to process a symbol decision signal S_D to generate another equalized signal S_FBF. For example, the FBF 104 may be implemented by an (n+1)-tap DFE having (n+1) DFE coefficients FBF[0]-FBF[n] (n≥0). However, this is for illustrative purposes only, and is meant to be a limitation of the present invention. In practice, any suitable DFE structure may be employed by the FBF 104. That is, the present invention has no limitations on the FBF design.

The combining circuit 108 is configured to combine the data signal (e.g., equalized signal S_FFF obtained from equalizing the received signal S_IN[k]) and the equalized signal S_FBF to generate a sample signal S_S. For example, the combining circuit 108 may be implemented by a subtractor (which may be realized by an adder configured to perform subtraction), and may be used for subtracting the equalized signal S_FBF from the equalized signal S_FFF to generate the sample signal S_S (i.e., S_S=S_FFF−S_FBF). The decision circuit (e.g., slicer) 100 is configured to perform hard decision upon the sample signal S_S to generate the symbol decision signal S_D. It should be noted that, each of the equalized signals S_FFF, S_FBF and the sample signal S_S carries soft data, and the symbol decision signal S_D carries hard data. Considering a case where the received signal S_IN[k] is a digital signal derived from PAM4 signaling, each hard data decided by the slicer is one of four PAM symbols. Considering another case where the received signal S_IN[k] is a digital signal derived from 16-QAM signaling, each hard data decided by the slicer is one of sixteen QAM symbols.

The sequence detection circuit 106 is configured to perform sequence detection upon the data signal (e.g., equalized signal S_FFF) to generate and output a symbol sequence S_OUT. Taking PAM4 signaling for example, the symbol sequence S_OUT is a sequence of symbols each being decided by the sequence detection to be one of four PAM symbols. Taking 16-QAM signaling for example, the symbol sequence S_OUT is a sequence of symbols each being decided by the sequence detection to be one of sixteen QAM symbols. In this embodiment, the sequence detection circuit 106 is configured to employ the proposed MLSD with programmable BM computation reduction. As shown in FIG. 1, the sequence detection circuit 106 includes a region estimation, trellis selection and BM calculation circuit (labeled by "region DET & trellis SEL & BMCAL") 112, an add-compare-select (ACS) and path metric (PM) calculation circuit (labeled by "ACS & PMCAL") 114, a surviving path and trace-back circuit (labeled by "Traceback") 116, and a control circuit (labeled by "CTRL") 118.

Figure 2:
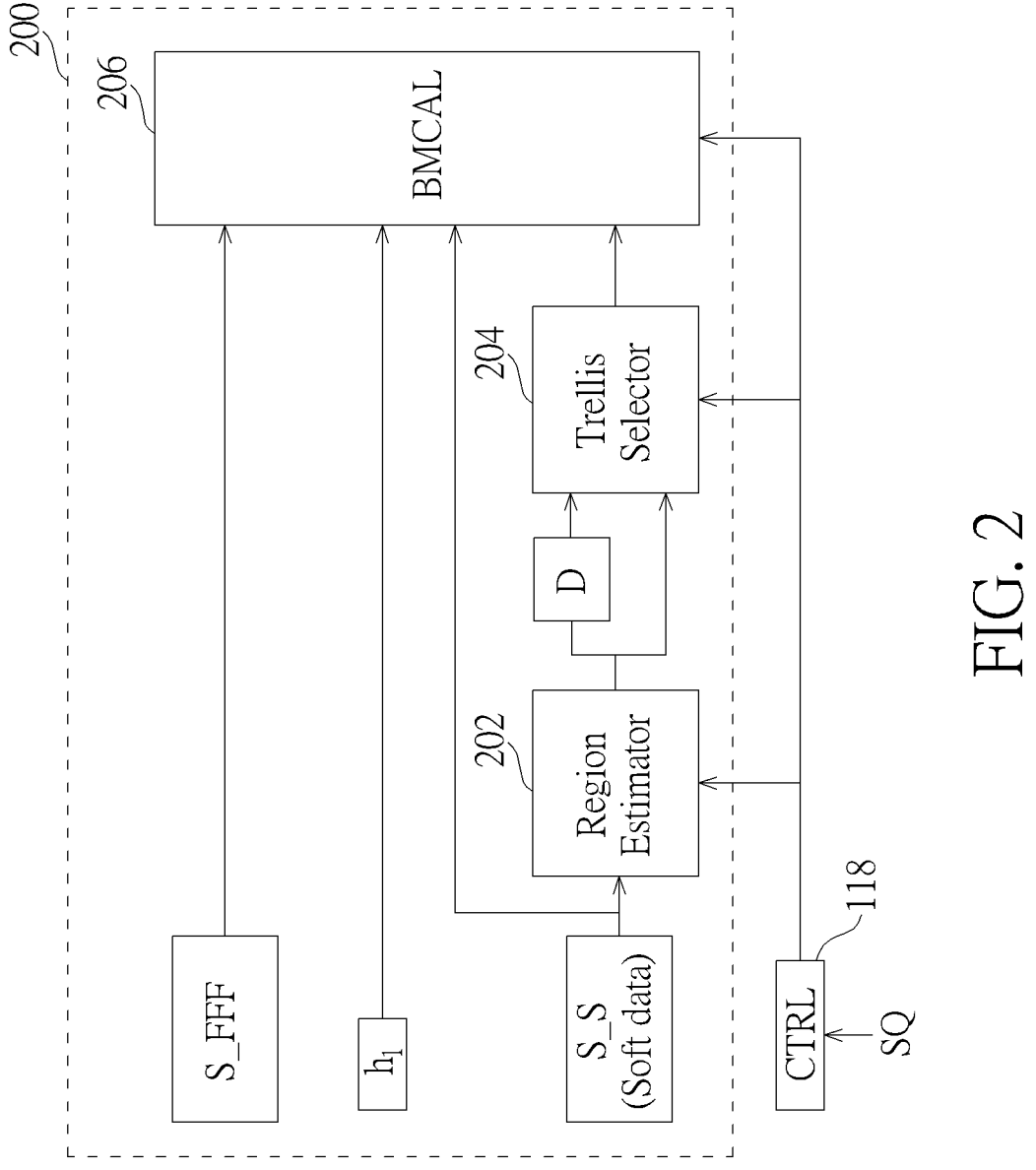
FIG. 2 is a diagram illustrating a region estimation, trellis selection and BM calculation circuit according to an embodiment of the present invention.
Figure 3:
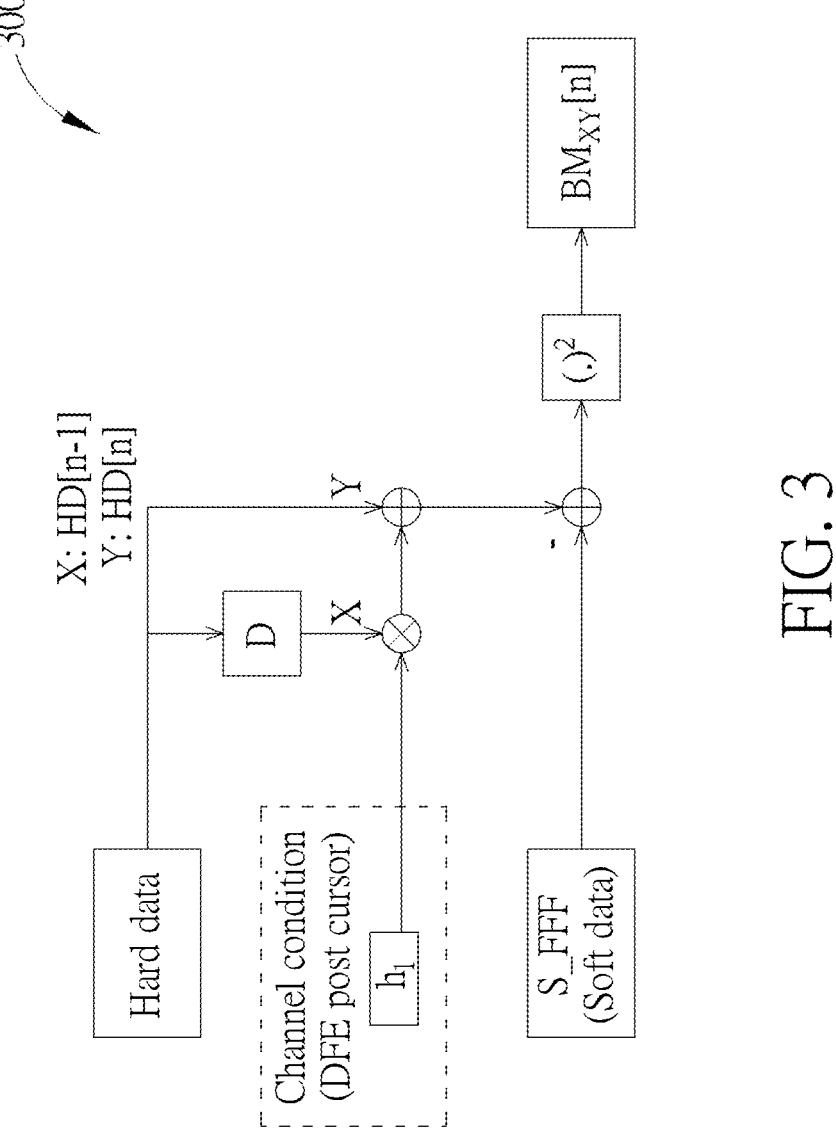
FIG. 3 is a diagram illustrating a BM calculation unit employed by the BM calculation circuit shown in FIG. 2.

FIG. 2 is a diagram illustrating a region estimation, trellis selection and BM calculation circuit according to an embodiment of the present invention. The region estimation, trellis selection and BM calculation circuit 112 shown in FIG. 1 may be implemented using the region estimation, trellis selection and BM calculation circuit 200. In this embodiment, the region estimation, trellis selection and BM calculation circuit 200 includes a region estimation circuit (labeled by "region estimator") 202, a trellis selection circuit (labeled by "trellis selector") 204, and a BM calculation circuit (labeled by "BMCAL") 206. The BM calculation circuit 206 is configured to calculate a branch metric $BM_{XY}[n]$ of a branch between one preceding state X of trellis at a preceding time instant T[n−1] and one succeeding state Y of trellis at a succeeding time instant T[n]. FIG. 3 is a diagram illustrating a BM calculation unit employed by the BM calculation circuit 206 shown in FIG. 2. Suppose that the FBF 104 is implemented by a 1-tap DFE with a DFE coefficient $FBF[0]=h_1$. The BM calculation unit 300 is used to calculate and output the branch metric $BM_{XY}[n]$, where computation of the branch metric $BM_{XY}[n]$ may be expressed using the following equation.

$$BM_{XY}[n]=(Y+h_1 *X-S\_FFF[n])^2 \qquad (1)$$

In above equation (1), X represents the hard data of state X at the time instant T[n−1] (i.e., X=HD[n−1]), Y represents the hard data of state Y at the time instant T[n] (i.e., Y=HD[n]), S_FFF[n] represents soft data of a received sample at the time instant T[n], and the DFE coefficient $FBF[0]=h_1$ is indicative of the channel condition. Specifically, the branch metric $BM_{XY}[n]$ is indicative of an error distance to a target level from state X at time instant T[n−1] to state Y at time instant T[n].

The ACS and PM calculation circuit 114 is configured to calculate a path metric $PM_Y[n]$ of one state Y of trellis at the time instant T[n], where the path metric $PM_Y[n]$ is indicative of an accumulated error distance of a surviving path $SP_Y[n]$. The surviving path and trace-back circuit 116 is configured to record the surviving path $SP_Y[n]$. In addition, the surviving path and trace-back circuit 116 employs a trace-back approach to identify a sequence of symbols according to surviving paths. Since the present invention is focused on the proposed BM computation reduction technique implemented in the region estimation, trellis selection and BM calculation circuit 112/200 and a person skilled in the art should readily understand principles of the rest of operations (e.g., PM calculation, SP determination, and SP-based traceback) performed by the sequence detection circuit 106, further description of the rest of operations performed by the sequence detection circuit 106 is omitted here for brevity.

The region estimation circuit 202 is independent of the decision circuit (e.g., slicer) 110 shown in FIG. 1. That is, the region estimation circuit 202 and the decision circuit (e.g., slicer) 110 are distinct circuits, and the region estimation operation performed at the region estimation circuit 202 does not rely on the hard decision operation performed at the decision circuit (e.g., slicer) 110. The region estimation circuit 202 is configured to categorize each of a plurality of samples included in the sample signal S_S into one of a plurality of regions, where the regions are defined by multiple threshold values. The trellis selection circuit 204 is configured to select one of a plurality of trellis schemes for BM calculation according to region estimation results of two of the samples output from the region estimation circuit 202, where each of the trellis schemes is indicative of selected branches with high possibilities between states at time instants T[n−1] and T[n]. Specifically, the trellis schemes may include a first trellis scheme and a second trellis scheme, wherein selected branches included in the first trellis scheme may be different from selected branches included in the second trellis scheme, and/or the number of selected branches included in the first trellis scheme may be different from the number of selected branches included in the second trellis scheme.

In this embodiment, the regions (particularly, threshold values that define the regions) adopted by the region estimation circuit 202 for region estimation of each sample (soft data) included in the sample signal S_S may be adaptively adjusted, and/or the trellis schemes adopted by the trellis selection circuit 204 for trellis scheme selection may be adaptively adjusted. For example, the control circuit 118 is configured to obtain a signal quality indicator SQ such as a signal-to-noise ratio indicator SNRIND or an error level indicator ELIND, and adaptively adjust the threshold values (which are programmable) according to the signal quality indicator SQ (e.g., SQ=SNRIND or ELIND); and the trellis schemes adopted by the trellis selection circuit 204 are fixed. For another example, the control circuit 118 is configured to obtain a signal quality indicator SQ (e.g., SQ=SNRIND or ELIND), and adaptively adjust the trellis schemes (which are programmable) according to the signal quality indicator SQ; and the threshold values (regions) adopted by the region estimation circuit 202 are fixed. For yet another example, the control circuit 118 is configured to obtain a signal quality indicator SQ (e.g., SQ=SNRIND or ELIND), and adaptively adjust the threshold values (which are programmable) and the trellis schemes (which are programmable) according to the signal quality indicator SQ.

Figure 4:
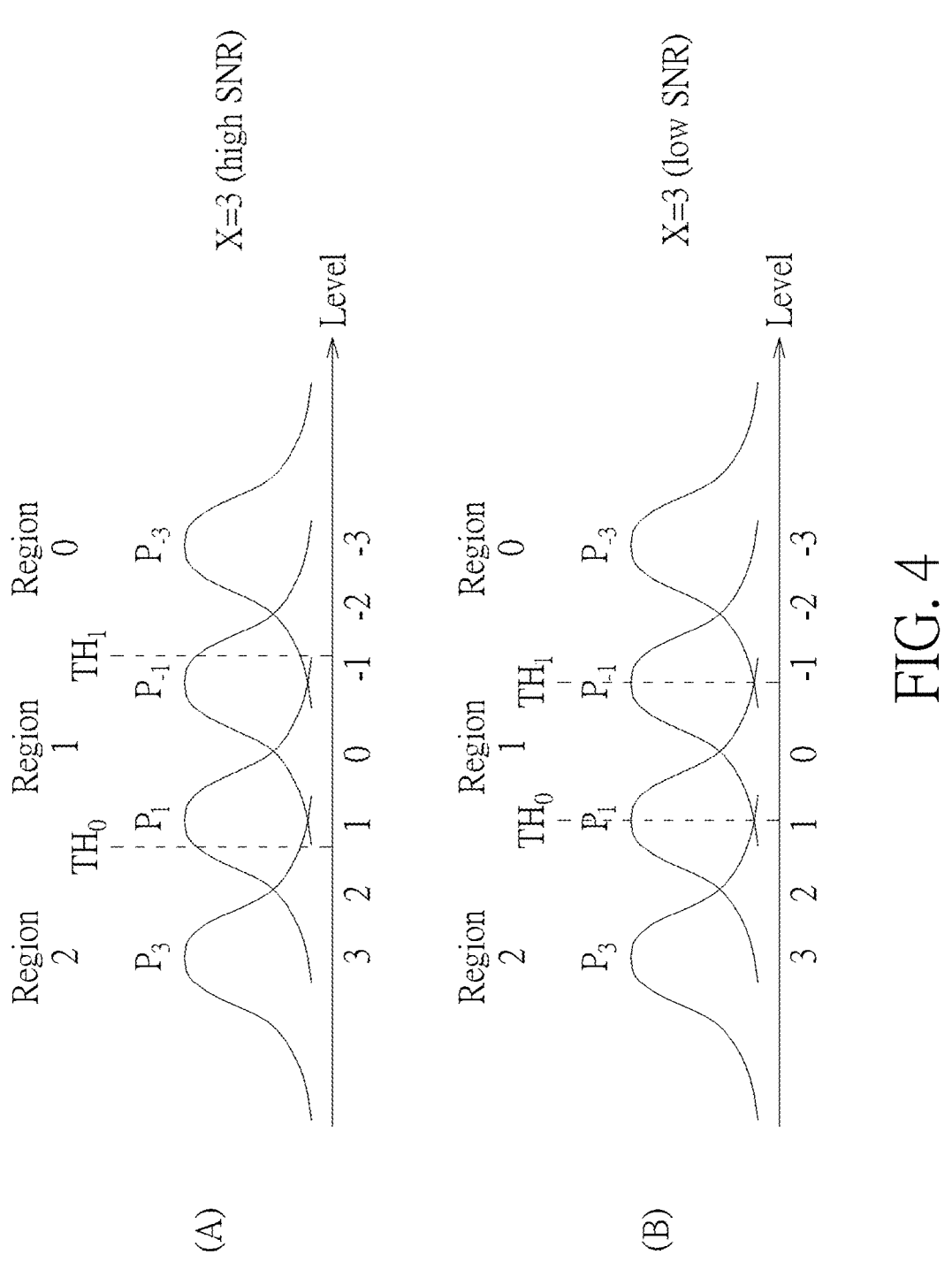
FIG. 4 is a diagram illustrating two programmable threshold values used by the region estimation circuit that is implemented by a 3-level slicer according to an embodiment of the present invention.

In some embodiments of the present invention, the region estimation circuit 202 may be implemented by X-level slicer (X≥2), and threshold values required by the X-level slicer may be programmable. FIG. 4 is a diagram illustrating two programmable threshold values $TH_0$, $TH_1$ used by the region estimation circuit 202 that is implemented by a 3-level slicer (X=3) according to an embodiment of the present invention. The region estimation circuit 202 may be used to process samples of the sample signal S_S that is generated for the received signal S_IN[k] derived from a PAM4 signal. The probability density functions $P_{-3}$, $P_{-1}$, $P_1$, $P_3$ of the symbols {−3, −1, +1, +3} transmitted over the data channel are illustrated in FIG. 4. Since probability distributions of different symbols {−3, −1, +1, +3} transmitted over the data channel may vary when the signal condition changes, the control circuit 118 instructs the region estimation circuit 202 to adaptively adjust the threshold values $TH_0$ and $TH_1$ for different signal conditions, thereby improving the sequence detection performance. For example, when the signal quality indicator SQ (e.g., SQ=SNRIND) indicates that the current signal condition is a high SNR condition, the control circuit 118 instructs the region estimation circuit 202 to adopt the threshold values $TH_0$ and $TH_1$ as illustrated in sub-diagram (A) of FIG. 4; and when the signal quality indicator SQ (e.g., SQ=SNRIND) indicates that the current signal condition is a low SNR condition, the control circuit 118 instructs the region estimation circuit 202 to adopt the threshold values $TH_0$ and $TH_1$ as illustrated in sub-diagram (B) of FIG. 4. When the region estimation circuit 202 categorizes a sample (soft data) of the sample signal S_S into region 2, it implies that the possibility of a symbol +3 or +1 that is transmitted over the data channel is high, and the possibility of a symbol −3 or −1 that is transmitted over the data channel is low. When the region estimation circuit 202 categorizes a sample (soft data) of the sample signal S_S into region 1, it implies that the possibility of a symbol −1 or +1 that is transmitted over the data channel is high, and the possibility of a symbol −3 or +3 that is transmitted over the data channel is low. When the region estimation circuit 202 categorizes a sample (soft data) of the sample signal S_S into region 0, it implies that the possibility of a symbol −3 or −1 that is transmitted over the data channel is high, and the possibility of a symbol +3 or +1 that is transmitted over the data channel is low. Hence, based on the region estimation results of two consecutive samples (e.g., a sample at the time instant T[n−1] and a sample at the time instant T[n]), some branches between states at time instants T[n−1] and T[n] may have high possibilities, and some branches between states at time instants T[n−1] and T[n] may have low possibilities. Hence, branches with low possibilities may be unselected to achieve BM computation reduction. Specifically, the number of BM calculations per symbol can be reduced since the possibilities of certain branches are too low and these low-possibility branches are not worth doing BM computation.

Figure 5:
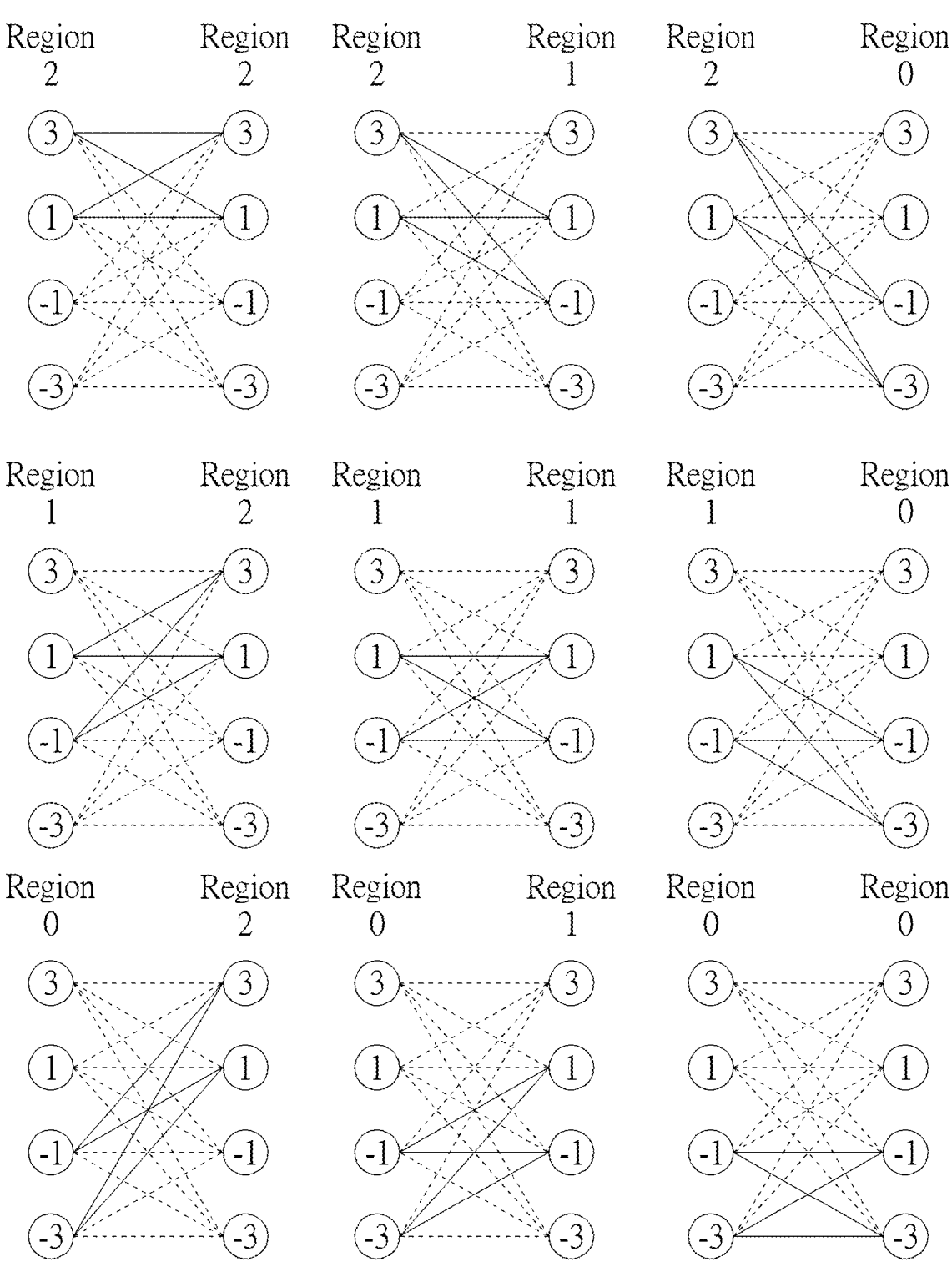
FIG. 5 is a diagram illustrating fixed trellis schemes used by the trellis selection circuit according to an embodiment of the present invention.

FIG. 5 is a diagram illustrating fixed trellis schemes used by the trellis selection circuit 204 according to an embodiment of the present invention. The fixed trellis schemes shown in FIG. 5 are shared under different signal conditions (e.g., high SNR condition and low SNR condition). Hence, each of the trellis schemes is indexed by a region estimation result of a sample at the time instant T[n−1] and a region estimation result of a sample at the time instant T[n] that are determined using the threshold values $TH_0$ and $TH_1$ illustrated in sub-diagram (A) of FIG. 4 or the threshold values $TH_0$ and $TH_1$ illustrated in sub-diagram (B) of FIG. 4. The trellis selection circuit 204 selects one of the fixed trellis schemes for BM computation according to a region estimation result of a sample at the time instant T[n−1] and a region estimation result of a sample at the time instant T[n]. For example, when the sample at the time instant T[n−1] is categorized into region 2 and the sample at the time instant T[n] is categorized into region 2, branches starting from states +3 and +1 and ending at states +3 and +1 are selected for BM computation, and branches starting from states −3 and −1 or ending at states −3 and −1 are not selected for BM computation. For another example, when the sample at the time instant T[n−1] is categorized into region 2 and the sample at the time instant T[n] is categorized into region 1, branches starting from states +3 and +1 and ending at states −1 and +1 are selected for BM computation, and branches starting from states −3 and −1 or ending at states +3 and −3 are not selected for BM computation. As a person skilled in the art can readily understand details of the rest of the trellis schemes shown in FIG. 5 after reading above description, further explanation is omitted here for brevity.

Figure 6:
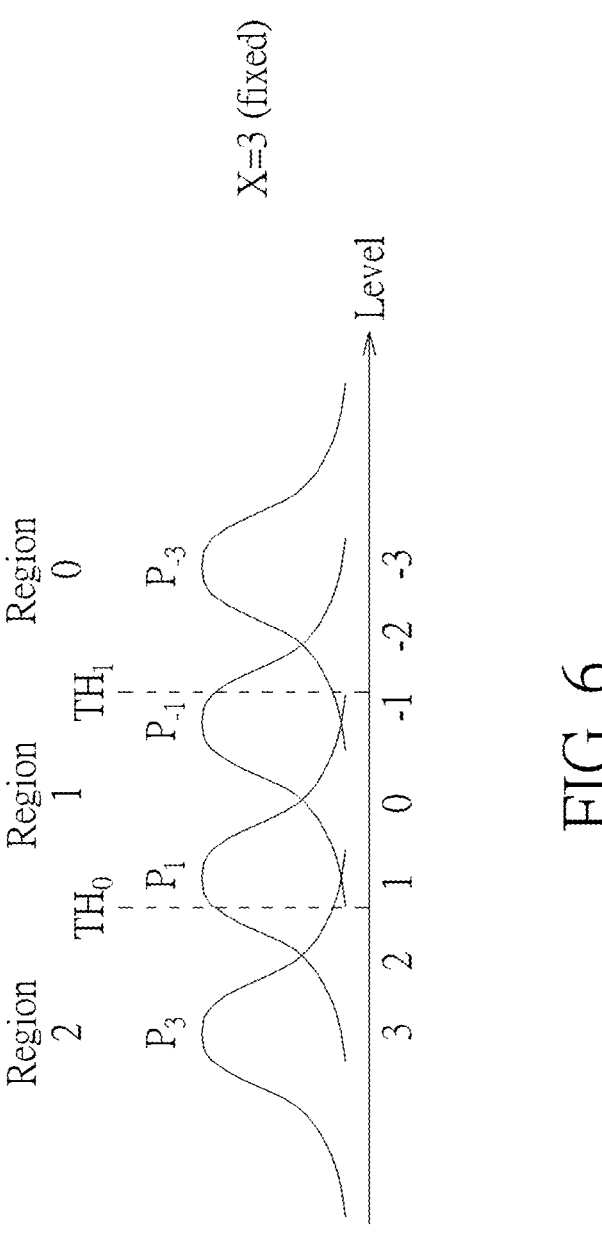
FIG. 6 is a diagram illustrating two fixed threshold values used by the region estimation circuit that is implemented by a 3-level slicer according to an embodiment of the present invention.

FIG. 6 is a diagram illustrating two fixed threshold values $TH_0$, $TH_1$ used by the region estimation circuit 202 that is implemented by a 3-level slicer (X=3) according to an embodiment of the present invention. The region estimation circuit 202 may be used to process samples of the sample signal S_S that is generated for the received signal S_IN[k] derived from a PAM4 signal. The fixed threshold values $TH_0$, $TH_1$ shown in FIG. 6 are shared under different signal conditions (e.g., high SNR condition and low SNR condition).

Figure 7:
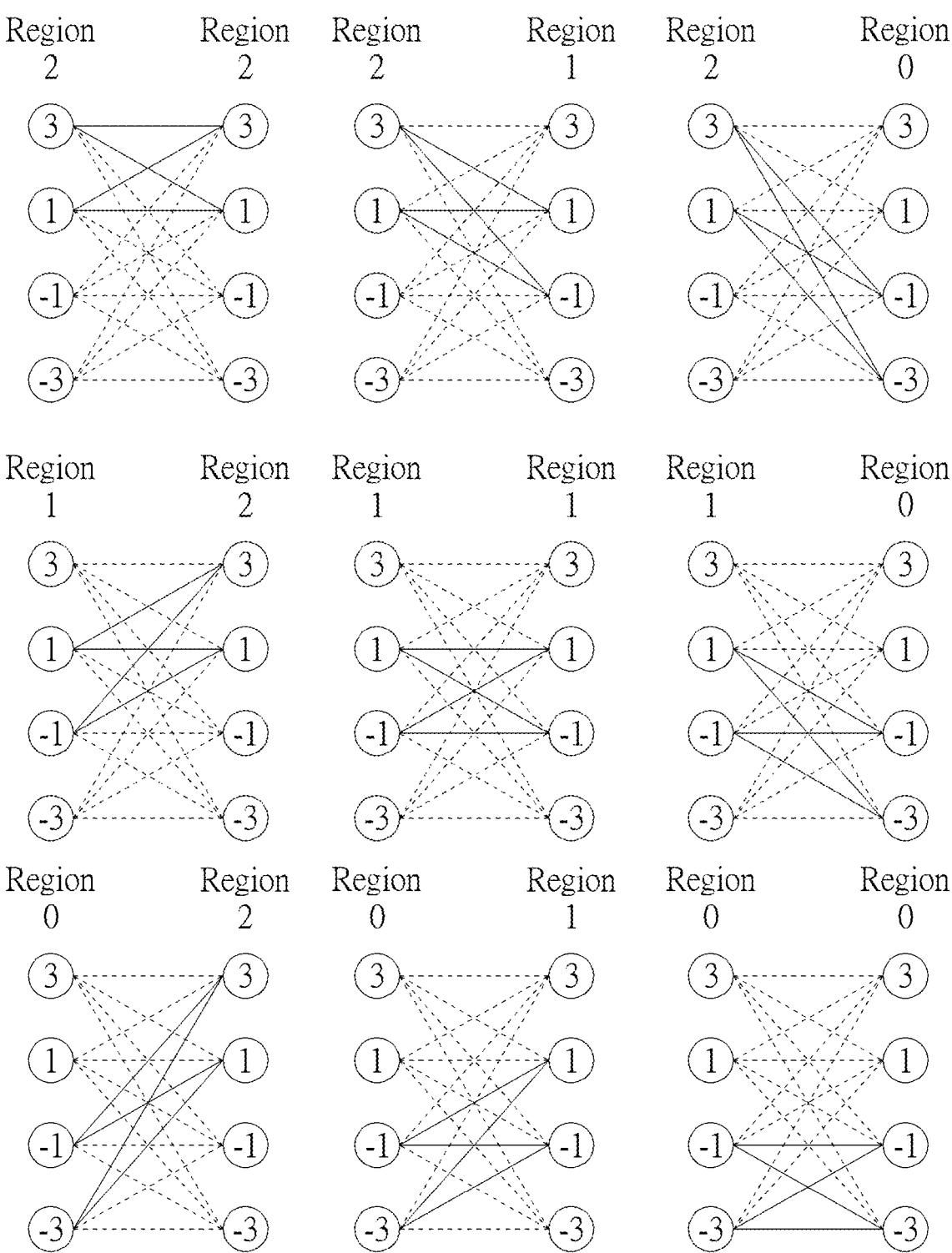
FIG. 7 is a diagram illustrating trellis schemes used under a high SNR condition according to an embodiment of the present invention.
Figure 8:
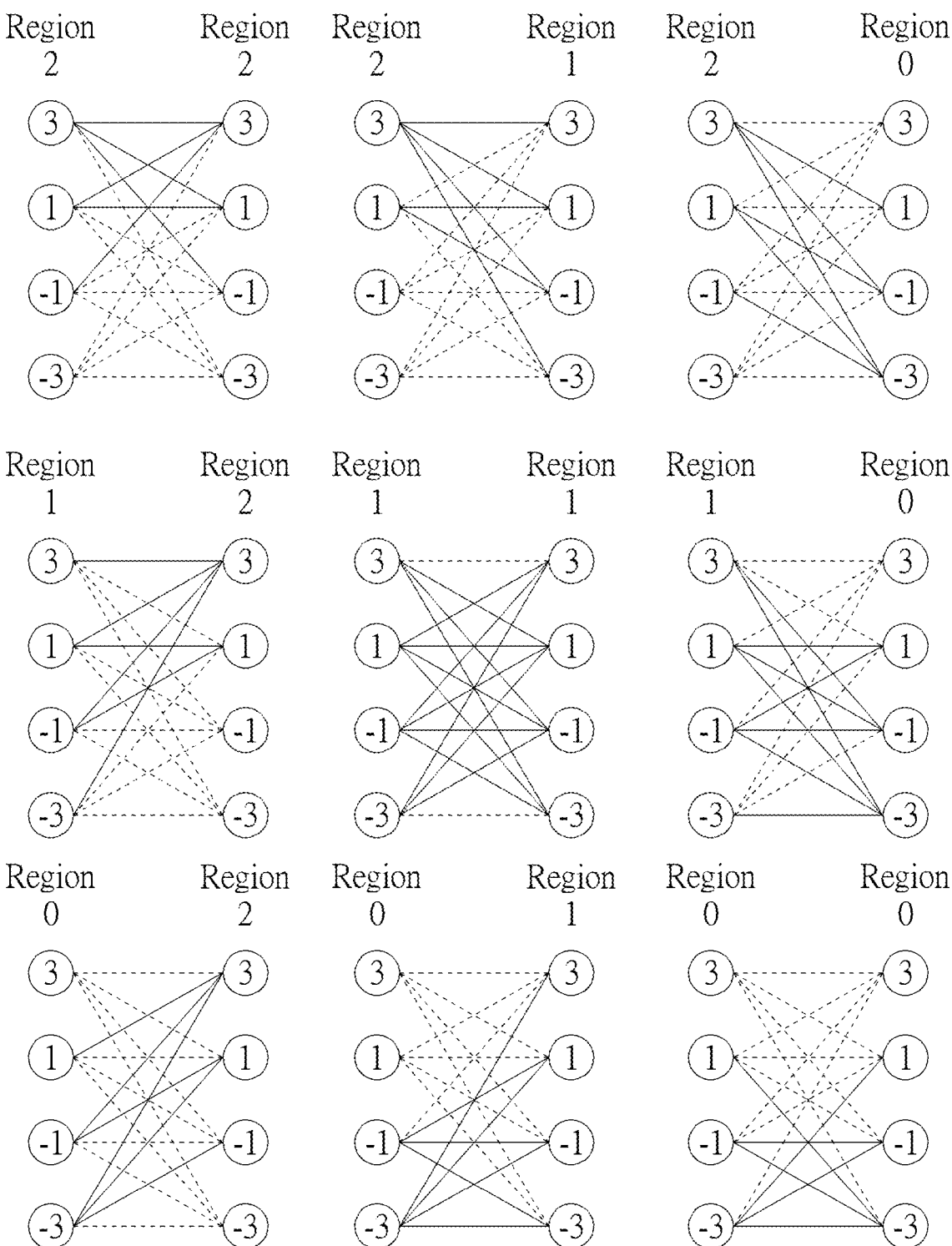
FIG. 8 is a diagram illustrating trellis schemes used under a low SNR condition according to an embodiment of the present invention.

As mentioned above, the probability distributions of different symbols {−3, −1, +1, +3} transmitted over the data channel may vary when the signal condition changes. In this embodiment, the control circuit 118 instructs the trellis selection circuit 204 to adaptively adjust the trellis schemes for different signal conditions, thereby improving the sequence detection performance. For example, when the signal quality indicator SQ (e.g., SQ=SNRIND) indicates that the current signal condition is a high SNR condition, the control circuit 118 instructs the trellis selection circuit 204 to adopt the trellis schemes illustrated in FIG. 7, where each of the trellis schemes is indexed by a region estimation result of a sample at the time instant T[n−1] and a region estimation result of a sample at the time instant T[n] that are determined using the fixed threshold values $TH_0$ and $TH_1$ illustrated in FIG. 6; and when the signal quality indicator SQ (e.g., SQ=SNRIND) indicates that the current signal condition is a low SNR condition, the control circuit 118 instructs the trellis selection circuit 204 to adopt the trellis schemes illustrated in FIG. 8, where each of the trellis schemes is indexed by a region estimation result of a sample at the time instant T[n−1] and a region estimation result of a sample at the time instant T[n] that are determined using the fixed threshold values $TH_0$ and $TH_1$ illustrated in FIG. 6.

The region estimation circuit 202 may be implemented by an X-level slicer (X≥2), and the threshold values used by the X-level slicer may be programmable or fixed. It should be noted that the value of X may be adjusted, depending upon actual design considerations.

Figure 9:
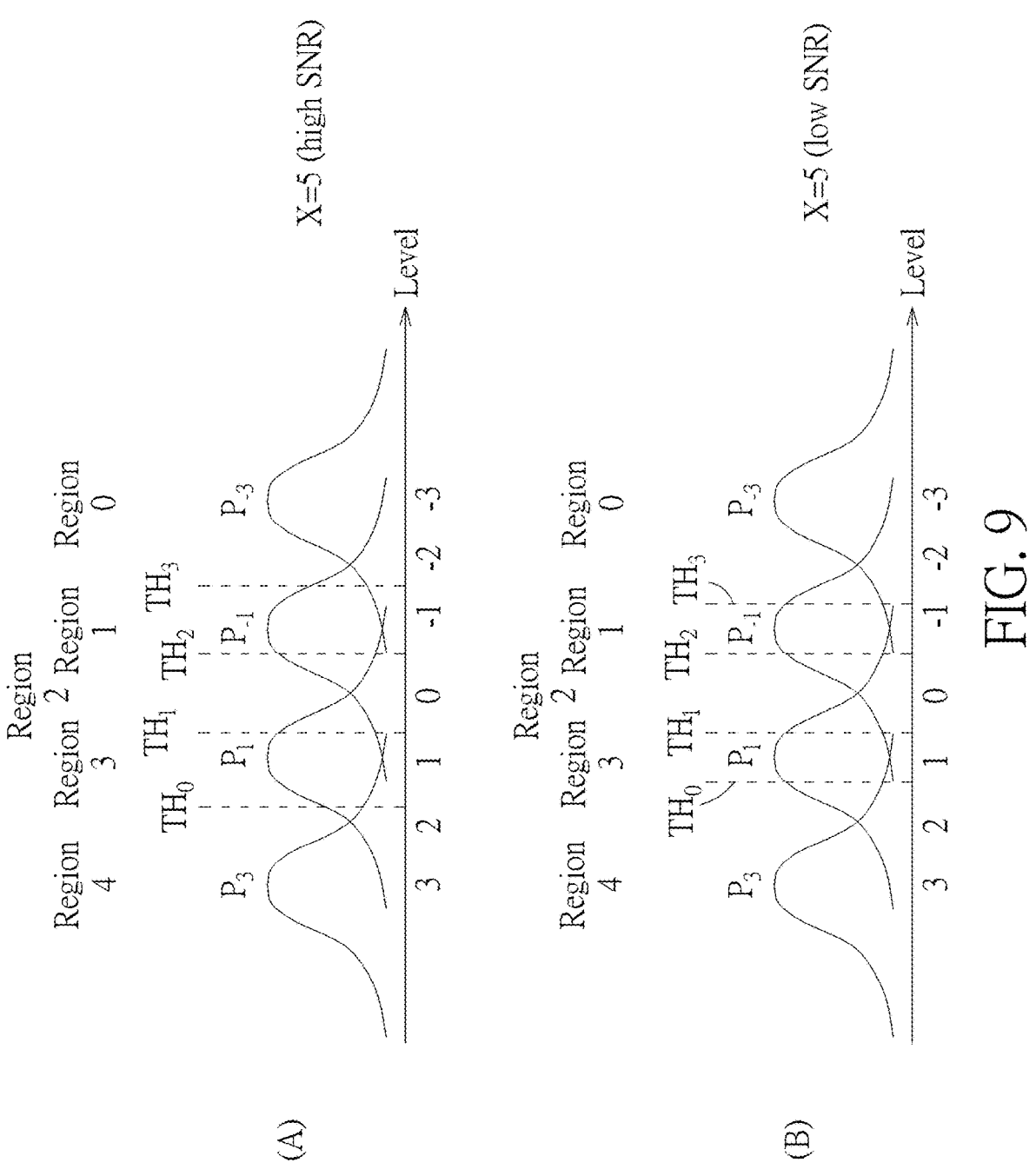
FIG. 9 is a diagram illustrating four programmable threshold values used by the region estimation circuit that is implemented by a 5-level slicer according to an embodiment of the present invention.

FIG. 9 is a diagram illustrating four programmable threshold values $TH_0$, $TH_1$, $TH_2$, $TH_3$ used by the region estimation circuit 202 that is implemented by a 5-level slicer (X=5) according to an embodiment of the present invention. The region estimation circuit 202 may be used to process samples of the sample signal S_S that is generated for the received signal S_IN[k] derived from a PAM4 signal. Since probability distributions of different symbols {−3, −1, +1, +3} transmitted over the data channel may vary when the signal condition changes, the control circuit 118 instructs the region estimation circuit 202 to adaptively adjust the threshold values $TH_0$, $TH_1$, $TH_2$, $TH_3$ for different signal conditions, thereby improving the sequence detection performance. For example, when the signal quality indicator SQ (e.g., SQ=SNRIND) indicates that the signal condition is a high SNR condition, the control circuit 118 instructs the region estimation circuit 202 to adopt the threshold values $TH_0$, $TH_1$, $TH_2$, $TH_3$ illustrated in sub-diagram (A) of FIG. 9; and when the signal quality indicator SQ (e.g., SQ=SNRIND) indicates that the signal condition is a low SNR condition, the control circuit 118 instructs the region estimation circuit 202 to adopt the threshold values $TH_0$, $TH_1$, $TH_2$, $TH_3$ illustrated in sub-diagram (B) of FIG. 9.

Figure 10:
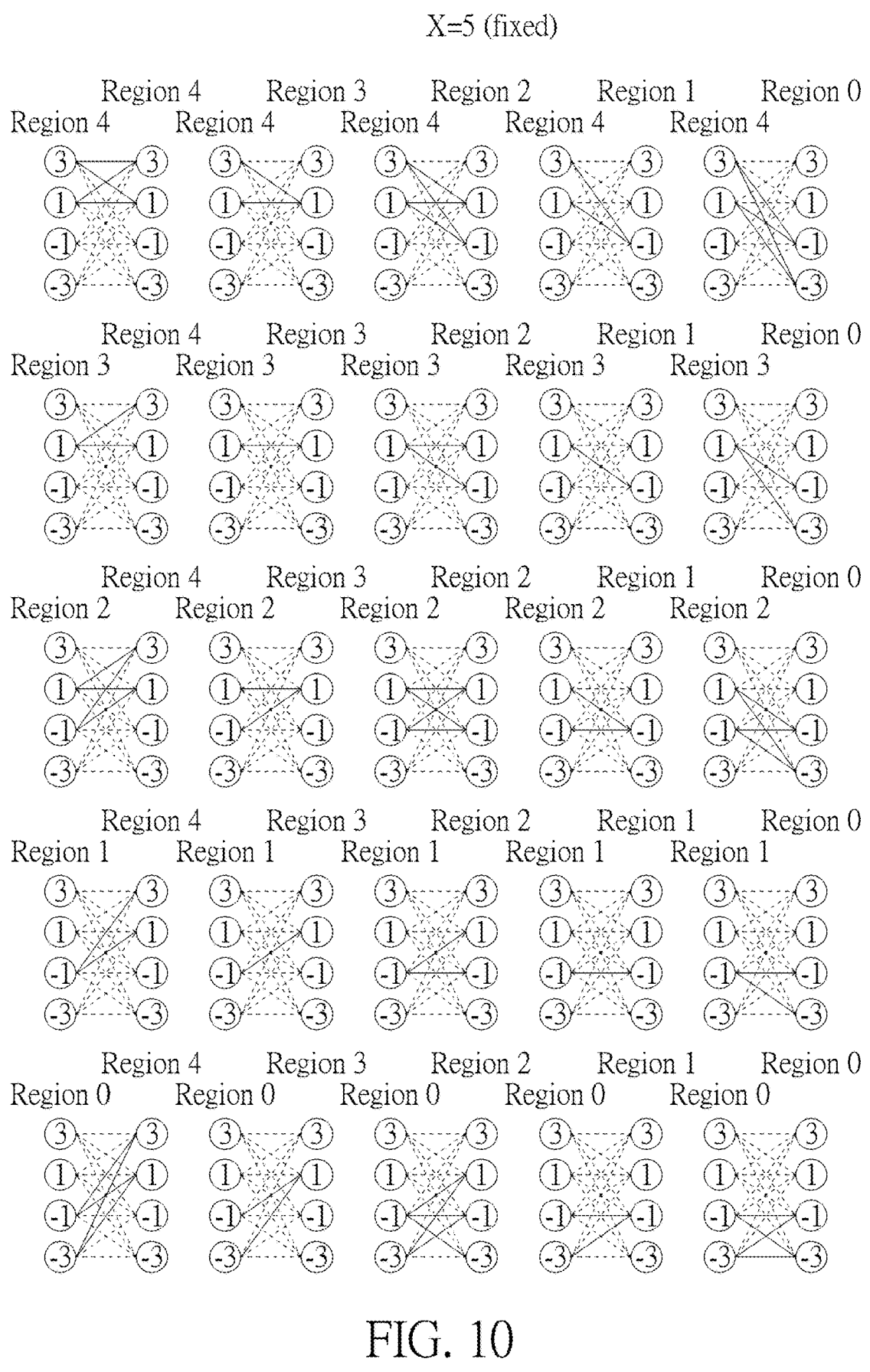

FIG. 10 is a diagram illustrating fixed trellis schemes used by the trellis selection circuit 204 according to an embodiment of the present invention. The fixed trellis schemes shown in FIG. 10 are shared under different signal conditions (e.g., high SNR condition and low SNR condition). Each of the trellis schemes is indexed by a region estimation result of a sample at the time instant T[n−1] and a region estimation result of a sample at the time instant T[n] that are determined using the threshold values $TH_0$, $TH_1$, $TH_2$, $TH_3$ illustrated in sub-diagram (A) of FIG. 9 or the threshold values $TH_0$, $TH_1$, $TH_2$, $TH_3$ illustrated in sub-diagram (B) of FIG. 9. Hence, the trellis selection circuit 204 selects one of the fixed trellis schemes for BM computation according to a region estimation result of a sample at the time instant T[n−1] and a region estimation result of a sample at the time instant T[n].

In above embodiments, the region estimation circuit 202 may be used to process samples of the sample signal S_S that is generated for the received signal S_IN[k] derived from a PAM4 signal. However, this is for illustrative purposes only, and is not meant to be a limitation of the present invention. In practice, the received signal S_IN[k] to be processed by the sequence detection device 100 may be derived from any PAM signal. For example, the received signal S_IN[k] may be derived from a Non-Return-to-Zero (NRZ) signal (also called PAM2 signal).

Figure 11:
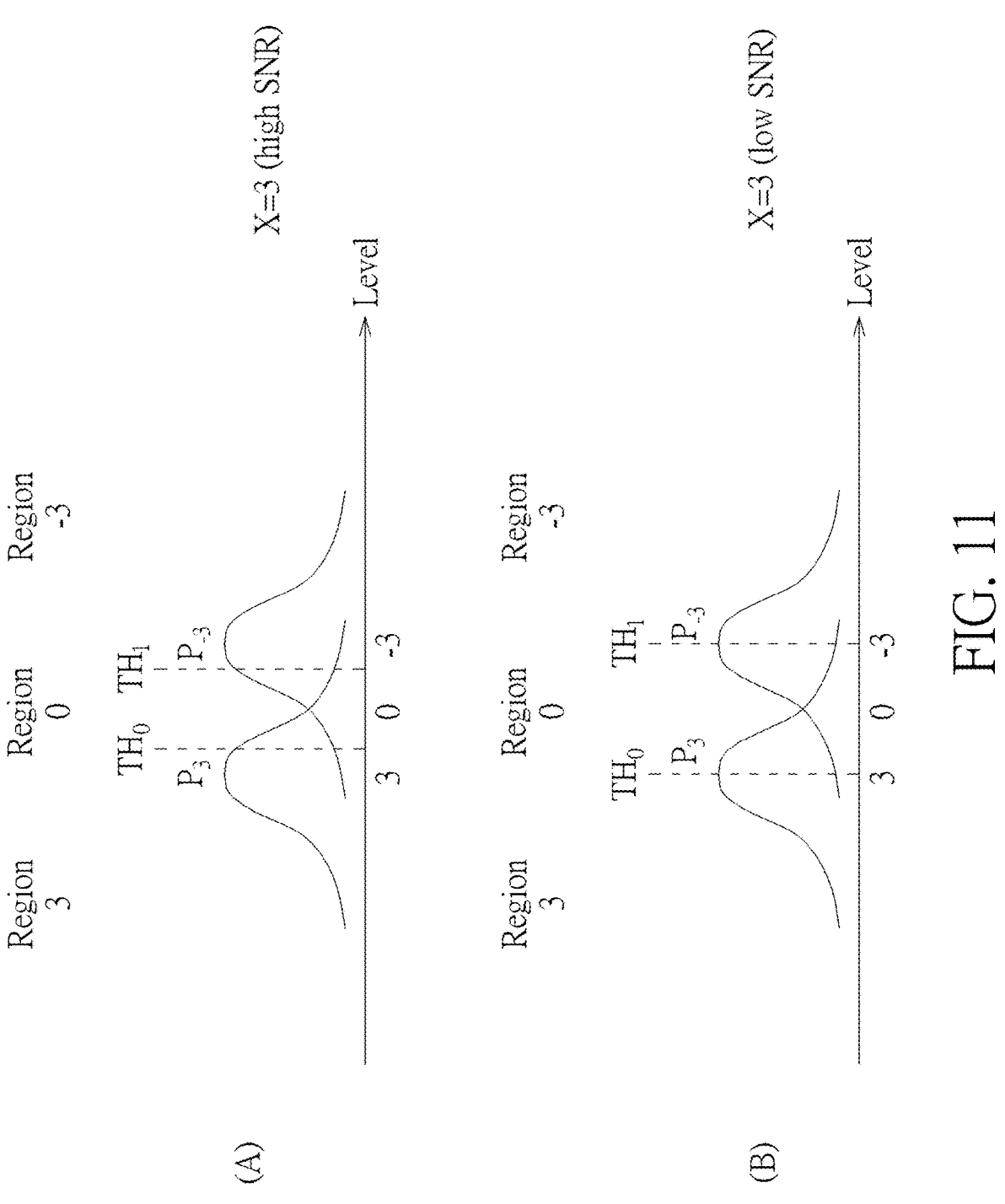
FIG. 11 is a diagram illustrating two programmable threshold values used by the region estimation circuit that is implemented by a 3-level slicer according to an embodiment of the present invention.

FIG. 11 is a diagram illustrating two programmable threshold values $TH_0$, $TH_1$ used by the region estimation circuit 202 that is implemented by a 3-level slicer (X=3) according to an embodiment of the present invention. The region estimation circuit 202 may be used to process samples of the sample signal S_S that is generated for the received signal S_IN[k] derived from an NRZ signal. Since probability distributions of different symbols {−3, +3} transmitted over the data channel may vary when the signal condition changes, the control circuit 118 instructs the region estimation circuit 202 to adaptively adjust the threshold values $TH_0$, $TH_1$ for different signal conditions, thereby improving the sequence detection performance. For example, when the signal quality indicator SQ (e.g., SQ=SNRIND) indicates that the current signal condition is a high SNR condition, the control circuit 118 instructs the region estimation circuit 202 to adopt the threshold values $TH_0$, $TH_1$ illustrated in sub-diagram (A) of FIG. 11; and when the signal quality indicator SQ (e.g., SQ=SNRIND) indicates that the current signal condition is a low SNR condition, the control circuit 118 instructs the region estimation circuit 202 to adopt the threshold values $TH_0$, $TH_1$ illustrated in sub-diagram (B) of FIG. 11.

Figure 12:
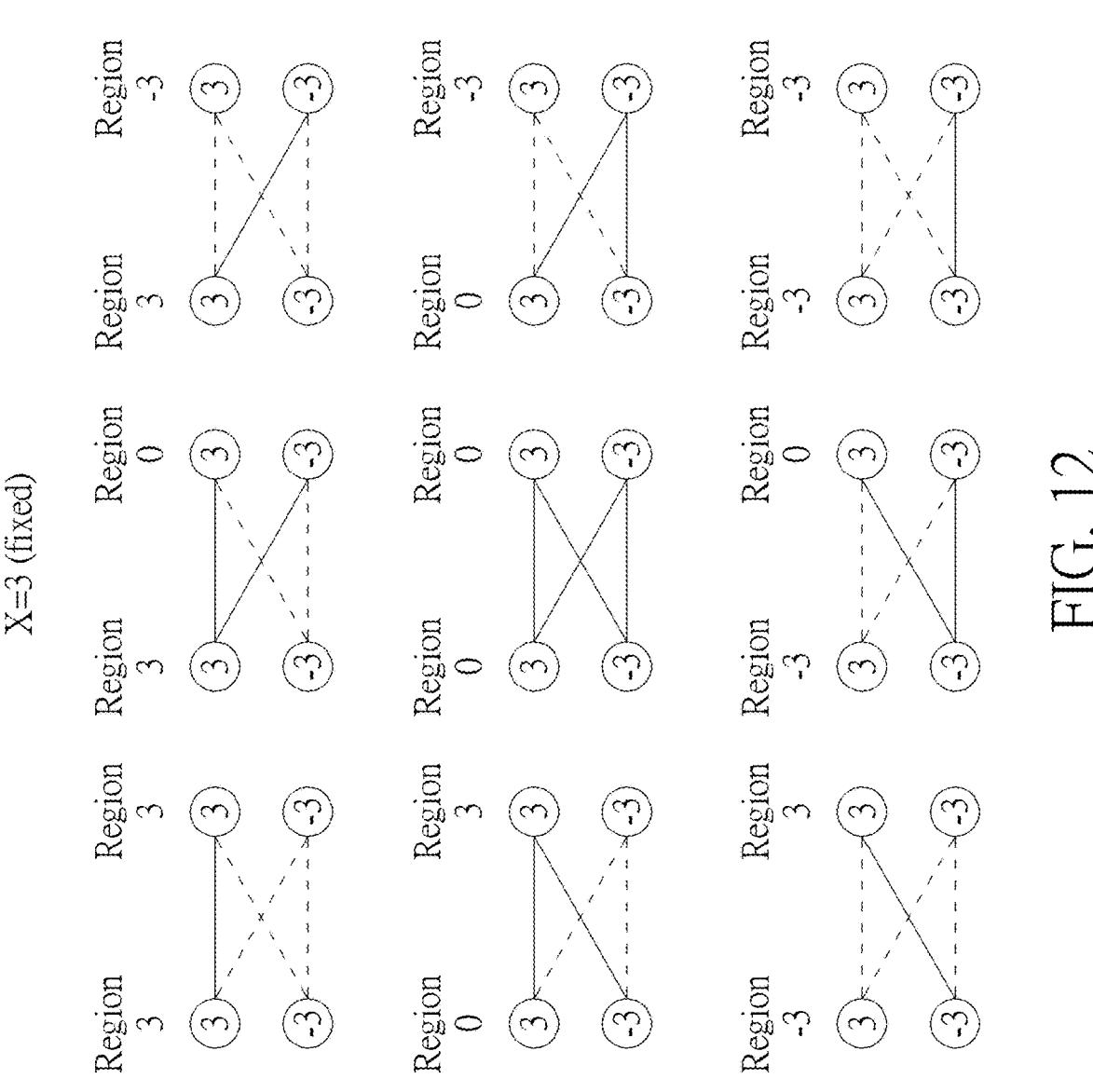
FIG. 12 is a diagram illustrating fixed trellis schemes used by the trellis selection circuit according to an embodiment of the present invention.

FIG. 12 is a diagram illustrating fixed trellis schemes used by the trellis selection circuit 204 according to an embodiment of the present invention. The fixed trellis schemes shown in FIG. 12 are shared under different signal conditions (e.g., high SNR condition and low SNR condition). Each of the trellis schemes is indexed by a region estimation result of a sample at the time instant T[n−1] and a region estimation result of a sample at the time instant T[n] that are determined using the threshold values $TH_0$, $TH_1$ illustrated in sub-diagram (A) of FIG. 11 or the threshold values $TH_0$, $TH_1$ illustrated in sub-diagram (B) of FIG. 11. Hence, the trellis selection circuit 204 selects one of the fixed trellis schemes for BM computation according to a region estimation result of a sample at the time instant T[n−1] and a region estimation result of a sample at the time instant T[n].

In above embodiments, the region estimation circuit 202 may be used to process samples of the sample signal S_S that is generated for the received signal S_IN[k] derived from a PAM signal. However, this is for illustrative purposes only, and is not meant to be a limitation of the present invention. In some embodiments of the present invention, the received signal S_IN[k] to be processed by the sequence detection device 100 may be derived from a QAM signal such as a 16-QAM signal.

Figure 13:
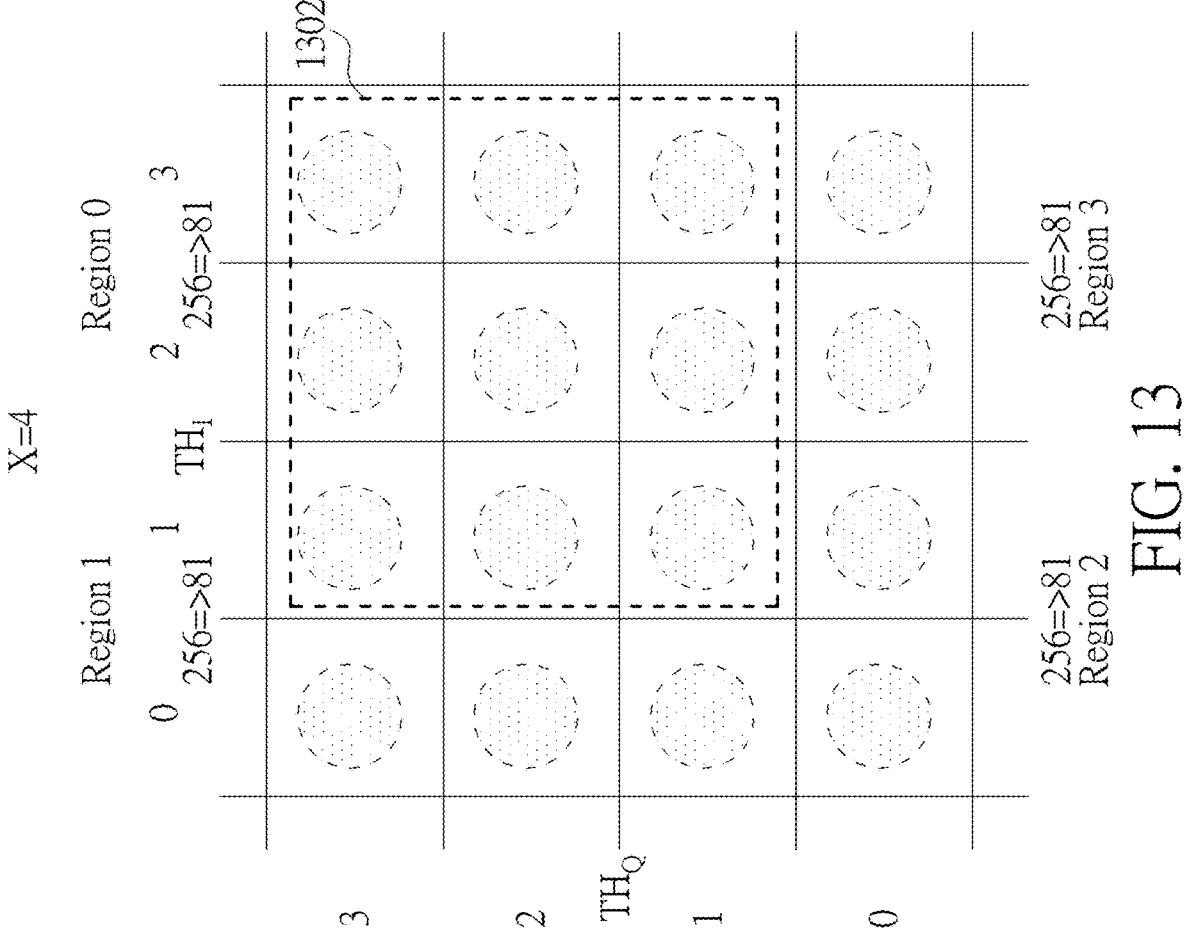
FIG. 13 is a diagram illustrating two programmable threshold values used by the region estimation circuit that is implemented by a 4-level slicer according to an embodiment of the present invention.

FIG. 13 is a diagram illustrating two programmable threshold values $TH_1$, $TH_0$ used by the region estimation circuit 202 that is implemented by a 4-level slicer (X=4) according to an embodiment of the present invention. The region estimation circuit 202 may be used to process samples of the sample signal S_S that is generated for the received signal S_IN[k] derived from a 16-QAM signal. When the region estimation circuit 202 categorizes a QAM sample (soft data) of the sample signal S_S into one region (e.g., region 0), it implies that the probability of a QAM symbol that is located within a possible area (e.g., region 0 possible area 1302) and transmitted over the data channel is high, and the probability of a QAM symbol that is located outside the possible area (e.g., region 0 possible area 1302) and transmitted over the data channel is low. Supposing that the FBF 104 is implemented by a 1-tap DFE, the number of BM calculations per symbol can be reduced from 256 (i.e., $16^2$) to 81 (i.e., $9^2$).

Figure 14:
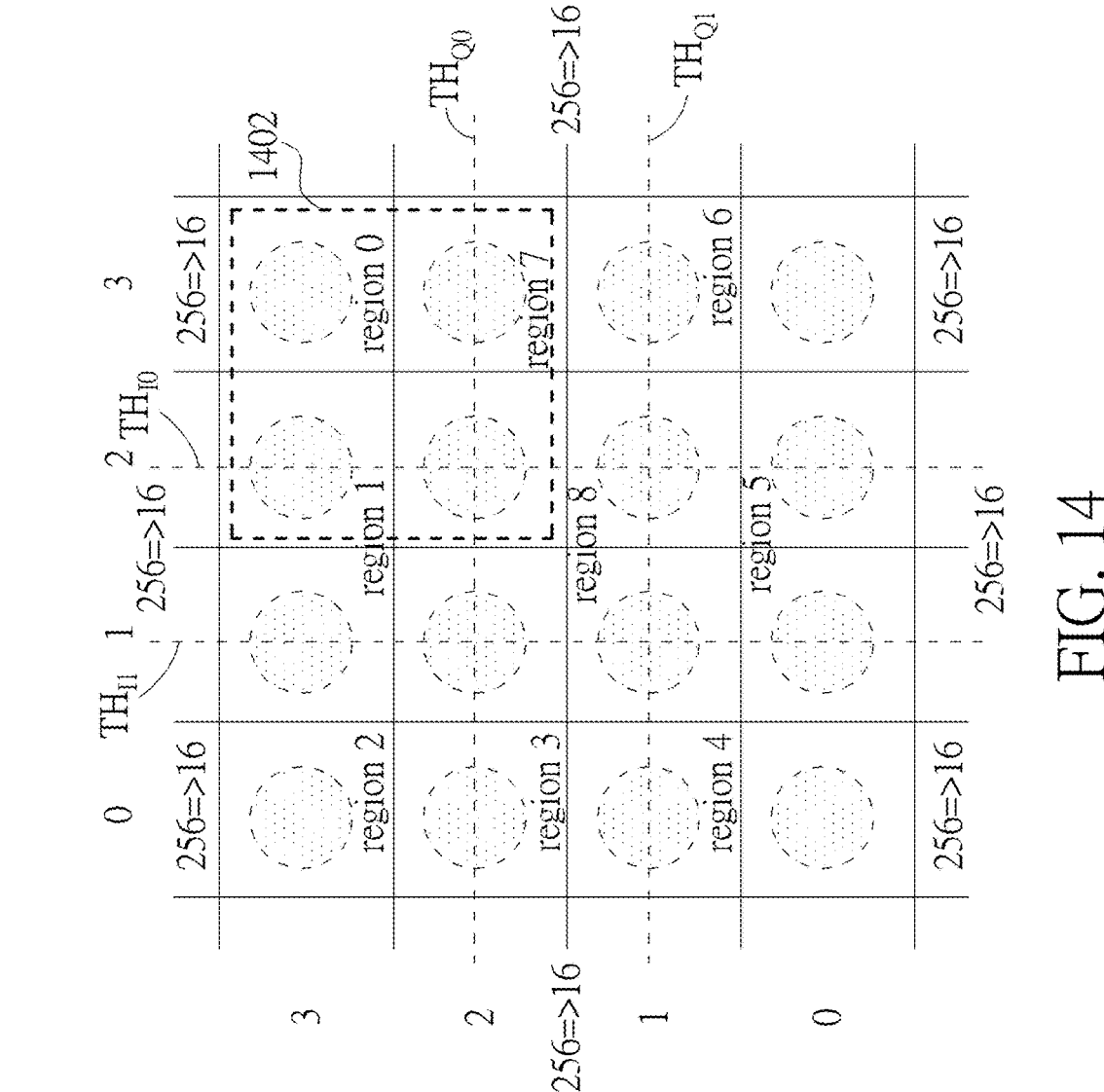
FIG. 14 is a diagram illustrating four programmable threshold values used by the region estimation circuit that is implemented by a 9-level slicer according to an embodiment of the present invention.

FIG. 14 is a diagram illustrating four programmable threshold values $TH_{I0}$, $TH_{I1}$, $TH_{Q0}$, $TH_{Q1}$ used by the region estimation circuit 202 that is implemented by a 9-level slicer (X=9) according to an embodiment of the present invention. The region estimation circuit 202 may be used to process samples of the sample signal S_S that is generated for the received signal S_IN[k] derived from a 16-QAM signal. When the region estimation circuit 202 categorizes a QAM sample (soft data) of the sample signal S_S into one region (e.g., region 0), it implies that the probability of a QAM symbol that is located within a possible area (e.g., region 0 possible area 1402) and transmitted over the data channel is high, and the probability of a QAM symbol that is located outside the possible area (e.g., region 0 possible area 1402) and transmitted over the data channel is low. Supposing that the FBF 104 is implemented by a 1-tap DFE, the number of BM calculations per symbol can be greatly reduced from 256 (i.e., $16^2$) to 16 (i.e., $4^2$).

Figure 15:
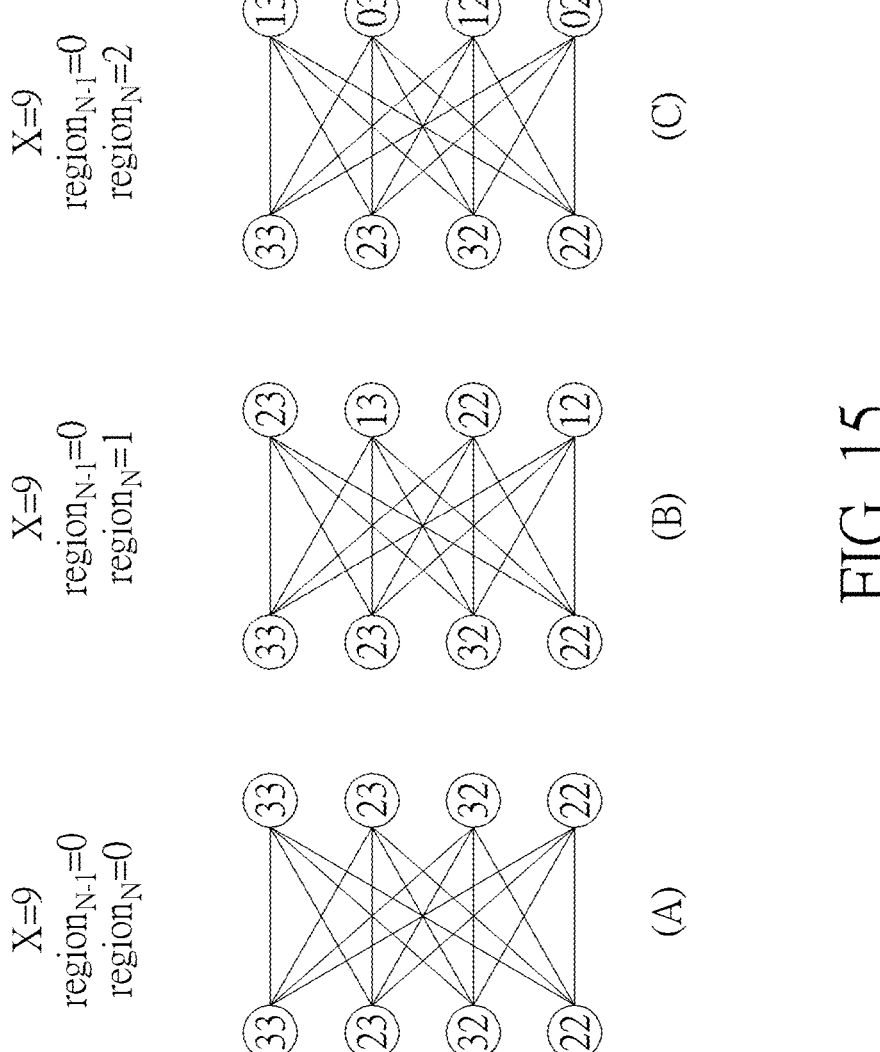
FIGS. 15-17 are diagrams illustrating some trellis schemes that can be used by the trellis selection circuit according to an embodiment of the present invention.
Figure 16:
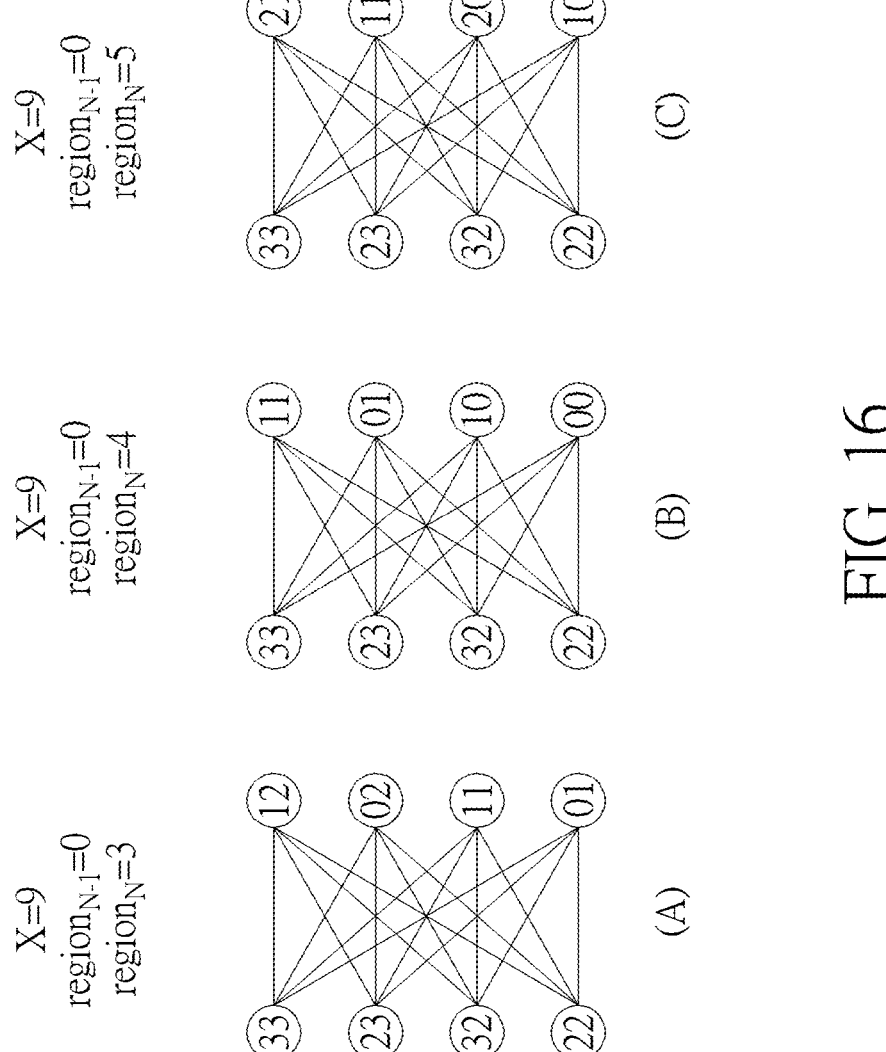
Figure 17:
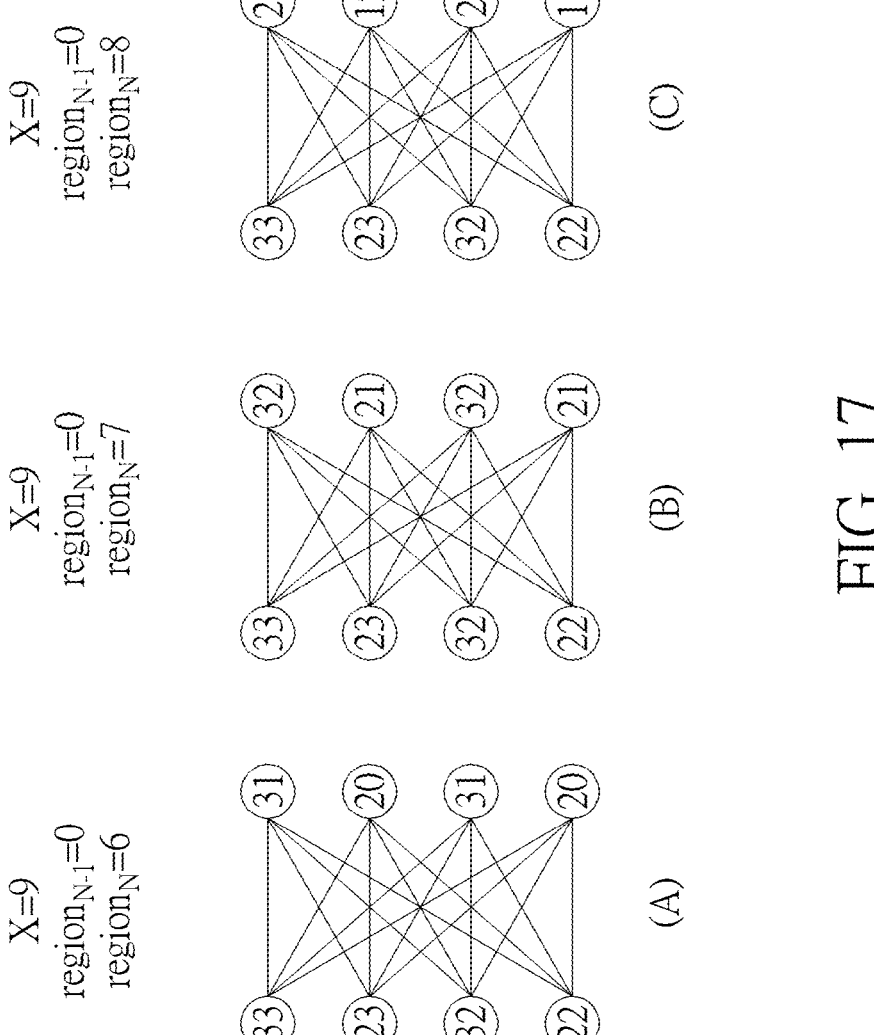

As shown in FIG. 14, when the region estimation circuit 202 categorizes a QAM sample (soft data) of the sample signal S_S into region 0, it implies that the possibility of a QAM symbol (3, 3), (2, 3), (3, 2), or (2, 2) transmitted over the data channel is high. FIGS. 15-17 are diagrams illustrating some trellis schemes that can be used by the trellis selection circuit 204 according to an embodiment of the present invention. Regarding a case where $region_{N-1}$=region 0 and $region_N$=region 0, only 16 branches starting from states 33, 23, 32, 22 and ending at states 33, 23, 32, 22 are selected for BM computation, as illustrated in sub-diagram (A) of FIG. 15. Regarding a case where $region_{N-1}$=region 0 and $region_N$=region 1, only 16 branches starting from states 33, 23, 32, 22 and ending at states 23, 13, 22, 12 are selected for BM computation, as illustrated in sub-diagram (B) of FIG. 15. Regarding a case where $region_{N-1}$=region 0 and $region_N$=region 2, only 16 branches starting from states 33, 23, 32, 22 and ending at states 13, 03, 12, 02 are selected for BM computation, as illustrated in sub-diagram (C) of FIG. 15.

Regarding a case where $region_{N-1}$=region 0 and $region_N$=region 3, only 16 branches starting from states 33, 23, 32, 22 and ending at states 12, 02, 11, 01 are selected for BM computation, as illustrated in sub-diagram (A) of FIG. 16. Regarding a case where $region_{N-1}$=region 0 and $region_N$=region 4, only 16 branches starting from states 33, 23, 32, 22 and ending at states 11, 01, 10, 00 are selected for BM computation, as illustrated in sub-diagram (B) of FIG. 16. Regarding a case where $region_{N-1}$=region 0 and $region_N$=region 5, only 16 branches starting from states 33, 23, 32, 22 and ending at states 21, 11, 20, 10 are selected for BM computation, as illustrated in sub-diagram (C) of FIG. 16.

Regarding a case where $region_{N-1}$=region 0 and $region_N$=region 6, only 16 branches starting from states 33, 23, 32, 22 and ending at states 31, 20, 31, 20 are selected for BM computation, as illustrated in sub-diagram (A) of FIG. 17. Regarding a case where region$_{N-1}$=region 0 and region$_N$=region 7, only 16 branches starting from states 33, 23, 32, 22 and ending at states 33, 21, 32, 21 are selected for BM computation, as illustrated in sub-diagram (B) of FIG. 17. Regarding a case where region$_{N-1}$=region 0 and region$_N$=region 8, only 16 branches starting from states 33, 23, 32, 22 and ending at states 22, 12, 21, 11 are selected for BM computation, as illustrated in sub-diagram (C) of FIG. 17.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sequence detection device comprising:
a feed-forward filter, configured to process a received signal to generate a first equalized signal;
a feedback filter, configured to process a symbol decision signal to generate a second equalized signal;
a combining circuit, configured to combine the first equalized signal and the second equalized signal to generate a sample signal;
a decision circuit, configured to perform hard decision upon the sample signal to generate the symbol decision signal; and
a sequence detection circuit, configured to perform sequence detection upon the first equalized signal to generate and output a symbol sequence, wherein the sequence detection circuit comprises:
a region estimation circuit, independent of the decision circuit and configured to categorize each of a plurality of samples included in the sample signal into one of a plurality of regions; and
a trellis selection circuit, configured to select one of a plurality of trellis schemes for branch metric calculation according to region estimation results of two of the plurality of samples output from the region estimation circuit.

2. The sequence detection device of claim 1, wherein the plurality of samples comprise consecutive samples, the consecutive samples comprise a first sample and a second sample following the first sample, the region estimation circuit generates a first region estimation result for the first sample and a second region estimation result for the second sample, and the trellis selection circuit selects a trellis scheme, indexed by the first region estimation result and the second region estimation result, from the plurality of trellis schemes.

3. The sequence detection device of claim 1, wherein the sequence detection circuit further comprises:
a control circuit, configured to adjust the plurality of regions adaptively.

4. The sequence detection device of claim 3, wherein the plurality of trellis schemes are fixed.

5. The sequence detection device of claim 3, wherein the control circuit is further configured to obtain a signal quality indicator, and adaptively adjust a plurality of threshold values according to the signal quality indicator, where the plurality of regions are defined by the plurality of threshold values.

6. The sequence detection device of claim 1, wherein the sequence detection circuit further comprises:

a control circuit, configured to adjust the plurality of trellis schemes adaptively.

7. The sequence detection device of claim 6, wherein the plurality of regions are fixed.

8. The sequence detection device of claim 6, wherein the control circuit is further configured to obtain a signal quality indicator, and adaptively adjust the plurality of trellis schemes according to the signal quality indicator.

9. The sequence detection device of claim 1, wherein the received signal is derived from a pulse amplitude modulation (PAM) signal.

10. The sequence detection device of claim 1, wherein the received signal is derived from a quadrature amplitude modulation (QAM) signal.

11. A sequence detection method comprising:
performing a feed-forward filtering operation upon a received signal to generate a first equalized signal;
performing a feedback filtering operation upon a symbol decision signal to generate a second equalized signal;
combining the first equalized signal and the second equalized signal to generate a sample signal;
performing a hard decision operation upon the sample signal to generate the symbol decision signal; and
performing a sequence detection operation upon the first equalized signal to generate and output a symbol sequence, wherein the sequence detection operation comprises:
performing a region estimation operation to categorize each of a plurality of samples included in the sample signal into one of a plurality of regions, wherein the region estimation operation is independent of the hard decision operation; and
performing a trellis selection operation to select one of a plurality of trellis schemes for branch metric calculation according to region estimation results of two of the plurality of samples output from the region estimation operation.

12. The sequence detection method of claim 11, wherein the plurality of samples comprise consecutive samples, the consecutive samples comprise a first sample and a second sample following the first sample, the region estimation operation generates a first region estimation result for the first sample and a second region estimation result for the second sample, and the trellis selection operation selects a trellis scheme, indexed by the first region estimation result and the second region estimation result, from the plurality of trellis schemes.

13. The sequence detection method of claim 11, wherein the sequence detection operation further comprises:
adjusting the plurality of regions adaptively.

14. The sequence detection method of claim 13, wherein the plurality of trellis schemes are fixed.

15. The sequence detection method of claim 13, wherein adjusting the plurality of regions adaptively comprises:
obtaining a signal quality indicator; and
adaptively adjusting a plurality of threshold values according to the signal quality indicator, where the plurality of regions are defined by the plurality of threshold values.

16. The sequence detection method of claim 11, wherein the sequence detection operation further comprises:
adjusting the plurality of trellis schemes adaptively.

17. The sequence detection method of claim 16, wherein the plurality of regions are fixed.

18. The sequence detection method of claim 16, wherein adjusting the plurality of trellis schemes adaptively comprises:

obtaining a signal quality indicator; and adaptively adjusting the plurality of trellis schemes according to the signal quality indicator.

19. The sequence detection method of claim 11, wherein the received signal is derived from a pulse amplitude modulation (PAM) signal.

20. The sequence detection method of claim 11, wherein the received signal is derived from a quadrature amplitude modulation (QAM) signal.

* * * * *